(12) United States Patent
Katzman et al.

(10) Patent No.: US 10,859,466 B2
(45) Date of Patent: Dec. 8, 2020

(54) METHODS AND APPARATUS FOR RATING EYEGLASS PROTECTION FROM INFRARED EXPOSURE

(71) Applicant: Shamir Optical Industry Ltd., Upper Galilee (IL)

(72) Inventors: Zohar Katzman, Haifa (IL); Gilad Markman, Upper Galilee (IL); Devora Nuriel, Yesod Hamaaleh (IL)

(73) Assignee: SHAMIR OPTICAL INDUSTRY LTD., Upper Galilee (IL)

( * ) Notice: Subject to any disclaimer, the term of this patent is extended or adjusted under 35 U.S.C. 154(b) by 8 days.

(21) Appl. No.: 16/077,557

(22) PCT Filed: Feb. 16, 2017

(86) PCT No.: PCT/IL2017/050208
§ 371 (c)(1),
(2) Date: Aug. 13, 2018

(87) PCT Pub. No.: WO2017/141252
PCT Pub. Date: Aug. 24, 2017

(65) Prior Publication Data
US 2019/0033167 A1 Jan. 31, 2019

Related U.S. Application Data

(60) Provisional application No. 62/296,757, filed on Feb. 18, 2016.

(51) Int. Cl.
*G01M 11/02* (2006.01)
*B07C 5/342* (2006.01)
(Continued)

(52) U.S. Cl.
CPC ......... *G01M 11/0285* (2013.01); *B07C 5/342* (2013.01); *G01M 11/005* (2013.01); *G01N 21/958* (2013.01)

(58) Field of Classification Search
CPC . G01M 11/0285; G01M 11/005; B07C 5/342; G01N 21/958
(Continued)

(56) References Cited

U.S. PATENT DOCUMENTS

| 9,000,390 B2 | 4/2015 | Citek et al. |
| 2012/0200847 A1 | 8/2012 | Hall |
| 2013/0341523 A1 | 12/2013 | Citek et al. |

OTHER PUBLICATIONS

International Search Report and Written Opinion in PCT/IL2017/050208 dated May 25, 2017, 8 pages.
(Continued)

*Primary Examiner* — David P Porta
*Assistant Examiner* — Gisselle M Gutierrez
(74) *Attorney, Agent, or Firm* — Browdy and Neimark, P.L.L.C.

(57) ABSTRACT

Conventionally, eyewear is rated in terms of its absorption coefficient (sometimes called the optical density (OD)) or the protection that it provides from ultraviolet (UV) radiation, which can damage the eye at high enough power levels. Infrared (IR) radiation can also damage the eye, but IR damage tends to occur at a much slower rate than UV-induced damage. Rating eyewear in terms of protection from IR radiation and/or in terms of a maximum safe exposure duration (SED) to IR radiation improves consumers' ability to protect themselves from IR radiation. In addition, eyewear rated for more IR protection or longer SED may still provide excellent vision thanks to coatings that reflect or absorb IR light and transmit visible light.

25 Claims, 11 Drawing Sheets

(51) Int. Cl.
*G01M 11/00* (2006.01)
*G01N 21/958* (2006.01)

(58) Field of Classification Search
USPC ........................................ 250/341.8
See application file for complete search history.

(56) References Cited

OTHER PUBLICATIONS

International Standard ISO 13666:1 998(E/F) First edition—"Ophthalmic optics—Spectacle lenses—Vocabulary" International Standard ISO Aug. 1, 1998 (Aug. 1, 1998), 66 pages.
Voke, Janet, "Radiation effects on the eye: Part 1—Infrared radiation effects on ocular tissue," Optometry Today, May 21, 1999, pp. 22-28.

• Transmittance spectra replotted from literature. Heavy dashed line, Geeraets et al. (1960), total eye media. Thin lines, Boettner and Wolter (1962): upper line, cornea; dashed line, aqueous; middle line, lens; and lower line, vitreous. Heavy continuous line, 1 mm of pure liquid water.

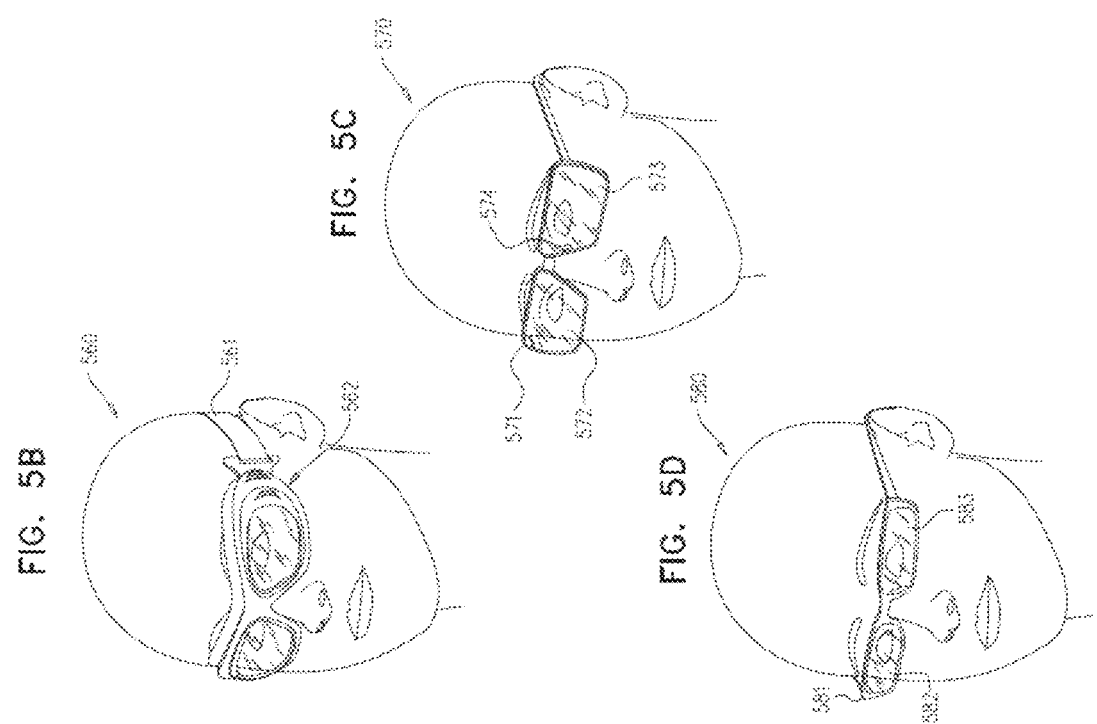

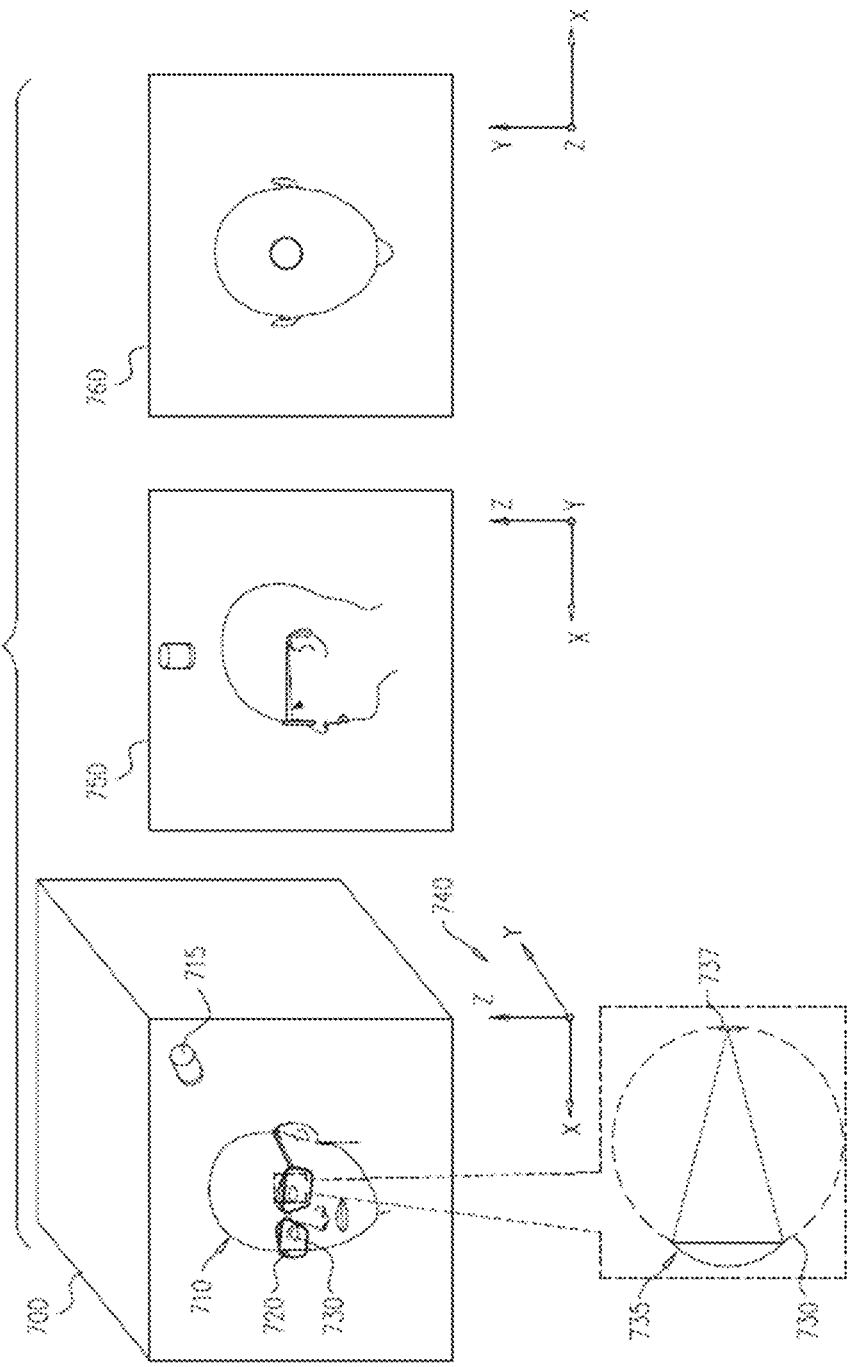

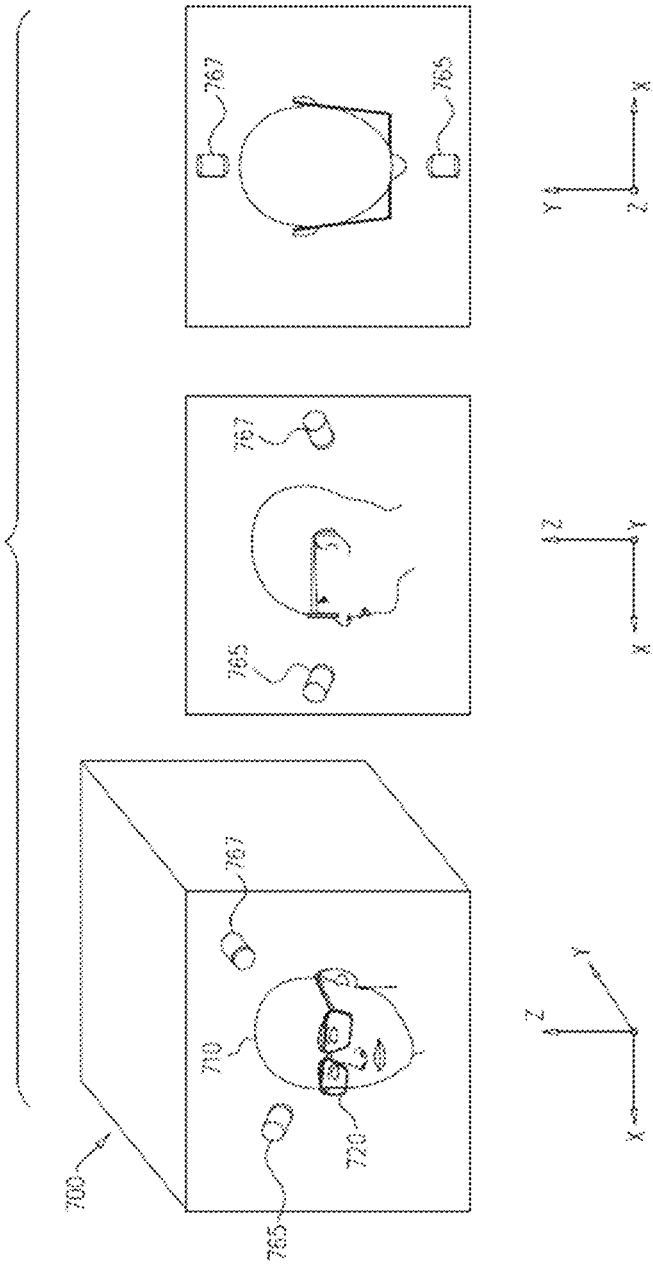

METHODS AND APPARATUS FOR RATING EYEGLASS PROTECTION FROM INFRARED EXPOSURE

CROSS-REFERENCE TO RELATED APPLICATION(S)

This application is a 371 national stage application of International Application No. PCT/IL2017/050208, entitled "Methods and Apparatus for Rating Eyeglass Protection from Infrared Exposure," which was filed on Feb. 16, 2017, and which claims the priority benefit, under 35 U.S.C. § 119(e), of U.S. Application No. 62/296,757, entitled "Methods and Apparatus for Rating Eyeglass Protection from Infrared Exposure," which was filed on Feb. 18, 2016. Each of these applications is incorporated herein by reference in its entirety.

BACKGROUND

While human eye damage tends to be much more acute from ultraviolet (UV) and short-wavelength blue-light exposure, excessive exposure to infrared (IR) light can cause damage to the cornea and the retina. For instance, exposure to IR-A light, or Near IR (NIR) light, from 780 nm to 1400 nm, can cause thermal retinal injury and thermal cataracts. Exposure to IR-B light, from 1400 nm to 3000 nm, or IR-C light, from 3000 nm to 10000 nm, can cause corneal burns and cataracts.

One type of IR tissue damage is photothermal damage. Photothermal damage occurs when the rate of light energy deposition by thermal deactivation is faster than thermal diffusion, so the temperature of the exposed tissue rises. In particular, infrared radiation induces molecular vibrations and rotations, and principally interacts with tissues that generate heat. Put differently, excessive exposure to IR light typically causes thermal injury of tissues mediated predominantly through heating of water molecules in the eye.

The local temperature in general, as well as within the eye, is a function of the heat flux entering the tissue, and the ability of the tissue to dissipate the heat, the exposure time, the ambient temperature, and other parameters. If the dissipation of heat is slower than the input flux, there will be a local temperature increase. Each organ in the eye is damaged to varying degrees depending on wavelength, exposure time, temperature, etc. Possible tissue damage from IR exposure includes damage to the cornea can include coagulation of the front and middle layers, the epithelium, and the stroma. The iris can suffer swelling, cell death, and hyperaema.

IR light can be especially harmful to the delicate photoreceptors in the retina. The most common form of retinal damage caused by exposure to direct sunlight and artificial light sources, including ophthalmic equipment, is photochemical damage. Light damage in the human retina due to excessive exposure to sunlight is known as solar retinopathy. It has been estimated that direct gazing at the sun with a constricted pupil of 2 mm in diameter produces an image of the sun on the retina of 0.16 mm in diameter in an emmetropic eye. The solar irradiance on the illuminated area of the retina depends on the latitude, season, and atmospheric conditions, but may be about 1.5 W/cm$^2$ to about 122 W/cm$^2$ when viewing the mid-day sun. Exposures lasting for several minutes to tens of minutes are sufficient to cause ophthalmoscopically visible damage.

Exposure to IR light can also cause harmful changes to protein structures in the lens. When the cornea absorbs incident IR radiation, it conducts the resulting heat to the lens, which in turn undergoes changes in protein structures. Aggregation of lens proteins after repeated exposure to extreme heat can cause lens opacities or cataracts.

The hazards of IR exposure may be particularly pronounced in industrial environments, for example, as shown by the relatively high incidence rate of retinal thermal injury and cataracts in glass, iron, and steel workers. Workers in these environments may be exposed to sources of harmful IR and NIR light, including but not limited to sunlight, high power light-emitting diodes (LEDs), proximity sensors, lasers, welding equipment, etc. Most NIR LEDs used in consumer products produce very low levels of NIR radiation and do not pose a significant threat to the human eye. However, under specific conditions and operational modes these components may produce sufficient NIR radiation to exceed standard exposure limits.

Many physical factors influence the possible IR damage, including pupil size, exposure duration, the size of the light source, the location of irradiation on the retina, the spectral distribution of the light source, ambient temperature, and the energy flux.

SUMMARY

Embodiments of the present invention include methods of estimating protection provided by eyewear from infrared light emitted by a light source. An example method may comprise estimating a first flux of the infrared light transmitted through a front surface of the eyewear, estimating a second flux of the infrared light reflected off a back surface of the eyewear, and estimating a safe exposure duration based on the first flux and the second flux. In some cases, estimating the safe exposure duration may include weighting the first flux by a first factor depending on an area of at least one optical element in the eyewear and weighting the second flux by a second factor depending an area between the eyewear and a head of a person wearing the eyewear.

Another method of estimating protection provided by eyewear from infrared light emitted by a light source comprises: measuring a first flux of the infrared light transmitted through a front surface of the eyewear; measuring a second flux of the infrared light reflected off a back surface of the eyewear; and estimating a safe exposure duration based on the first flux and the second flux. The first and second fluxes can be measured using an apparatus that includes a light source, a support, and a sensor in optical communication with the eyewear. The light source emits the infrared light, the support holds the eyewear in optical communication with the light source, and the sensor measures light transmitted through a front side of the eyewear and/or light reflected off a back side of the eyewear.

Embodiments of the present technology also include eyewear rated to reduce a flux of incident light to below a predetermined threshold for a predetermined time period.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 5B, 5C, and 5D are schematic illustrations of possible frame shapes that correlate to the frame parameters used for the combined rating determinations shown in FIG. 5A.

FIGS. 7A, 7B, and 7C are drawings of a device designed to measure frame parameters a, b, and c for the combined rating determinations for a given set of eyewear shown in FIG. 5A.

DETAILED DESCRIPTION

Figure 1:
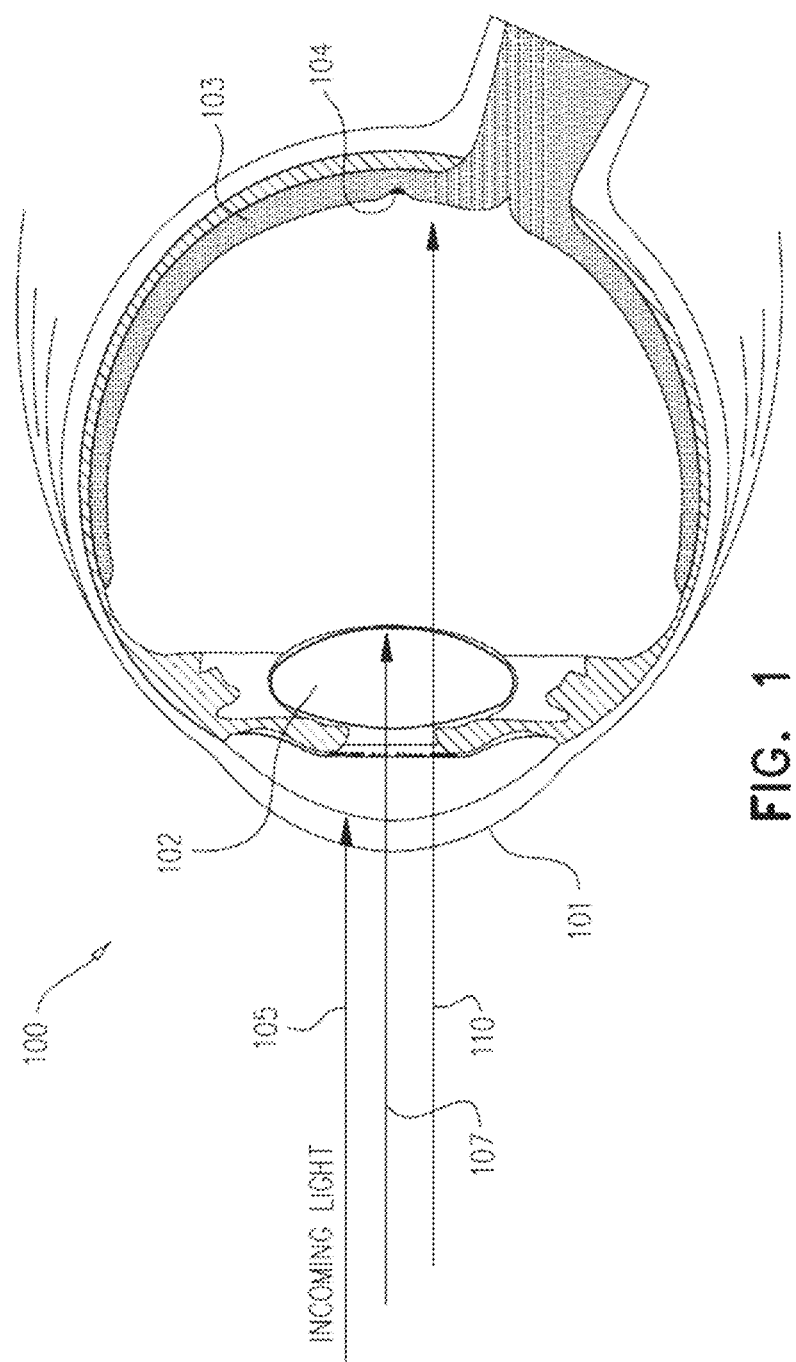
FIG. 1 is schematic diagram of the human eye, including organs sensitive to IR light, and light entering the eye.

To date, many ophthalmic lenses and sunglasses purport a high eye-Sun Protection Factor (eSPF) rating, as outlined in U.S. Pat. No. 9,000,390. However, this rating relates to an overall protection from UV light. An additional rating in US Pre-Grant Publication No. 2012/0200847 accounts for harmful light in various ranges of wavelengths, including UV, blue, and IR wavelengths. However, this rating relates to relative toxicity for each wavelength. The IR range toxicity is of a different nature than the toxicity for UV or blue light, since the level of damage is time dependent, and since the safe duration time for exposure under a particular flux can potentially be infinite. Thus, accounting for exposure time for those wavelengths that cause damage through thermal mechanisms would yield an improved rating.

Due to the relationship between the time to heat the eye to a particular temperature and the IR flux, it would be advantageous for an eyewear consumer rating to provide of a measure of time someone can safely be exposed to a standard IR environment, for example, in direct sunlight while wearing a particular pair of eyewear. This relationship is not trivial, as the safe exposure duration is not necessarily proportional to the total exposure (e.g., as measured in watts per square meter).

Current rating systems relate to a percent reduction in exposure. They do not contain any indication or reference to the maximum safe exposure period. The current ratings do not relate to safety standards either. Additionally, current ratings do not relate to the time dependence of the varying modes of radiation damage, such as UV radiation. Conversely, a time-dependent rating provides the user with a practical guideline to monitor radiation exposure. For example, a time-dependent rating may indicate that the user may reach the maximum exposure limit without eyewear after 40 minutes, and with specific eyewear, the maximum exposure limit is reached after 95 minutes.

A time-dependent IR exposure safety rating may be of particular interest for professions that involve frequent short sunlight exposures. High IR flux can cause thermal cellular retinal damage after only a few seconds, while exposure to lower IR flux levels may cause damage only after several minutes. Finally, there may be a safe flux below which exposure is safe with no time limit.

This application outlines the possible consequences of excessive exposure to infrared (IR) radiation. It also discloses methods of rating the protection offered by eyewear from IR radiation and methods of combining this rating with other ratings for eyeglasses protection from harmful radiation, including ultraviolet and blue (HEV) light. The ratings disclosed herein account for the time dependence of ocular damage as a result of exposure to thermally damaging wavelengths. Other methods disclosed herein include methods for estimating a safe exposure duration (SED) for a specific pair of eyeglasses.

This application also discloses eyewear rated according to the methods mentioned above. Although the local temperature is increased due to absorption of visible light, IR light is not visible to the human eye, so it can be filtered with suitably rated eyewear rated at no cost to the quality of vision. Suitably rated eyewear may offer a variety of classes of protection, including protection from exposure to high fluxes of IR radiation and from extended exposure to bright sunlight.

The Human Eye

Various forms of radiation can cause damage to the human eye. UV-radiation can cause direct damage to human tissue by ionizing molecules that make up biological tissue, including DNA. Visible and IR radiation can cause thermal damage to the eye. Each organ in the eye is sensitive to radiation at different wavelengths.

FIG. 1 is a simplified illustration of a human eye 100. The eye 100 includes a cornea 101 that transmits incoming light to the ocular lens 102, which focuses the incoming light onto the retina 103 and the macula 104. Some structures of the eye 100 are more sensitive to certain wavelengths than other structures of the eye 100, and radiation passes through some structures in order to reach others. Some structures thus act as filters. In particular, light 110 at wavelengths between approximately 400 and 1400 nm are transmitted by the cornea 101 and ocular lens 102 to the retina 103. Light 105 at wavelengths greater than 1400 nm may be reflected, scattered, or absorbed by the cornea 101, and light 107 at wavelengths between 900 nm and 1400 nm may be transmitted by the cornea 101 and reflected, scattered, or absorbed by the ocular lens 102.

Radiation Interaction with the Eye

Thermal injury in the eye depends on energy absorption and scattering of the infrared light in a volume of tissue for a given amount of incident energy delivered to a tissue by a light source. The tissue absorbs incident light at various wavelengths, and variations in the tissue's refractive index cause scattering. In the case of the retina, the absorbing NIR chromophore is melanin, which is concentrated in the retinal pigment epithelial (RPE) cells and focally in the choroid. Other parts of the eye may also absorb infrared light.

The optical penetration depth, δ, is determined by the simultaneous action of the absorption and scattering, within the tissue, and corresponds to the distance at which the fluence rate is reduced.

IR Ranges/Organ

Figure 2:
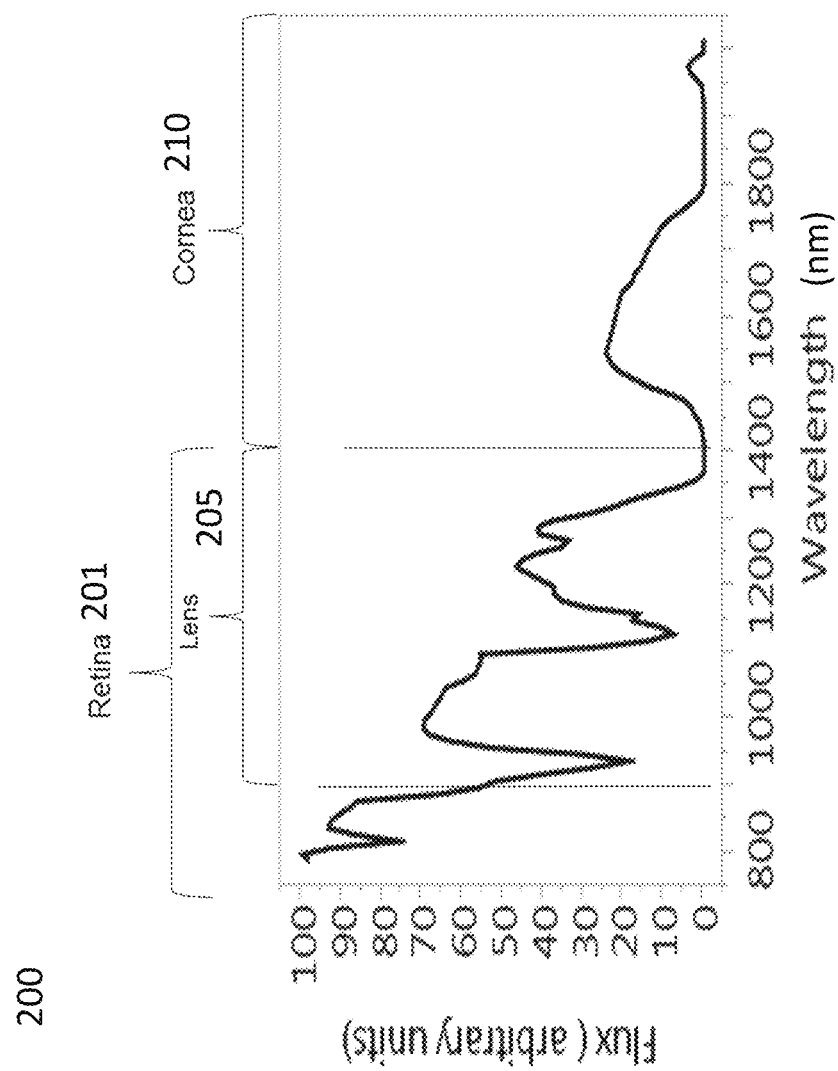
FIG. 2 is a graph of the relative solar spectral irradiance as a function of wavelength.

FIG. 2 is a graph depicting the relative spectral distribution of solar spectral irradiance in the infrared spectrum according to ISO standard 13666. The spectrum is split into bands that interact with the various susceptible organs in the eye. As outlined in J. Voke, "Radiation effects on the eye Part 1—Infrared radiation effects on ocular tissue," *Optometry Today* (May 21, 1999), which is incorporated herein by reference in its entirety, light 210 at IR wavelengths above 1400 nm is primarily absorbed by the cornea 101, since the longer wave IR radiation is very effectively absorbed by water in the atmosphere. Light 205 at wavelengths between 900 and 1400 nm is absorbed by the crystalline lens 102. And any IR light 201 at a wavelength below 1400 nm that is transmitted by the crystalline lens 102 may be absorbed by the retina 103.

IR Spectral Absorption

Figure 3:
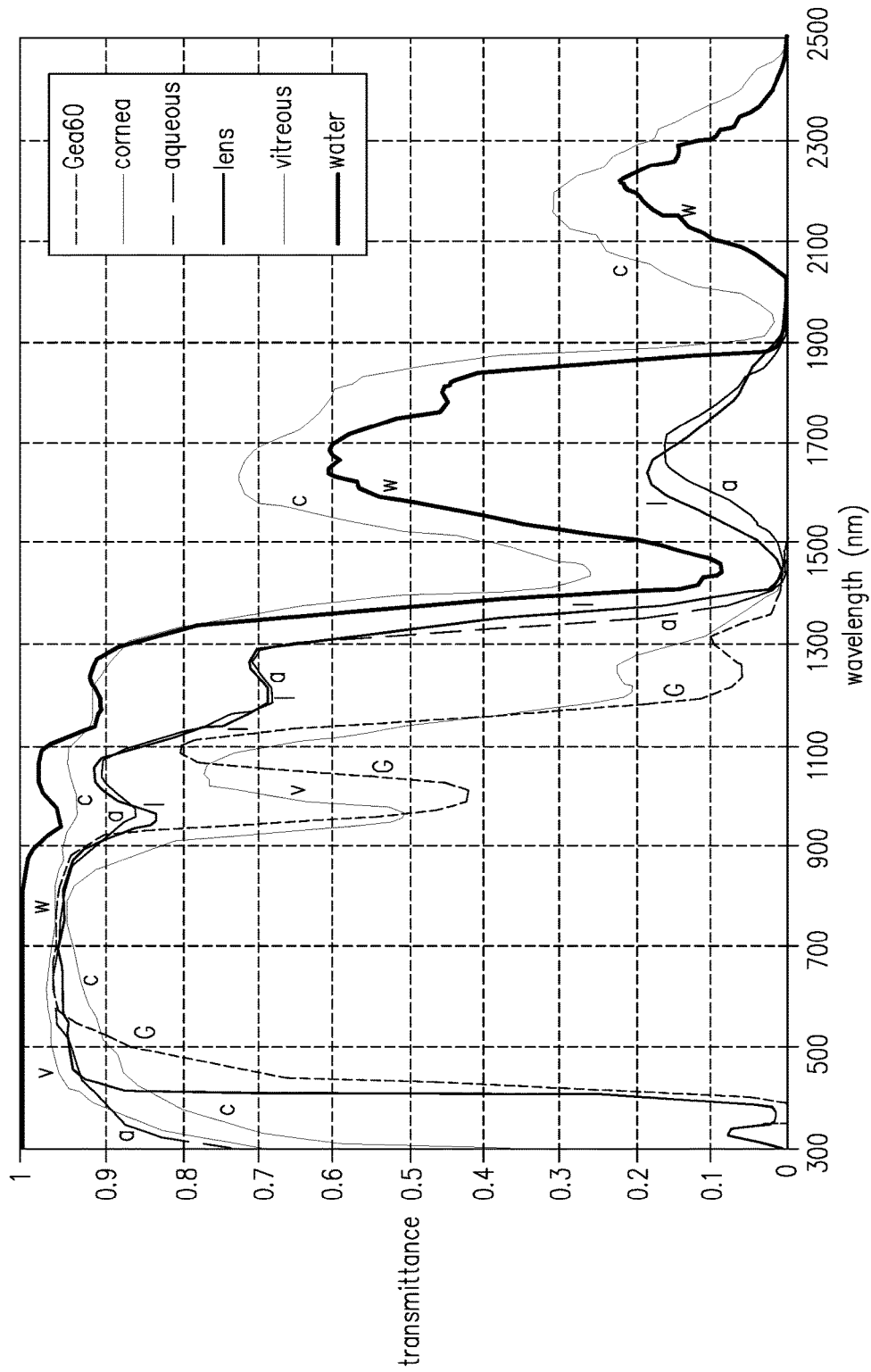
FIG. 3 is a graph of the transmittance spectra of various eye media (and water).

The IR spectral absorption of the eye is commonly likened to the spectral absorption of water. As can be seen in FIG. 3, the transmission spectra of the various eye media are plotted, in addition to the transmission spectrum of water. The absorption of longer-wave IR by the aqueous humor and the cornea is very high. The absorption in general is highly dependent on the wavelength. Absorption has a more significant thermal impact than scattering, and so the source spectral irradiance will cause more thermal damage if it has a higher proportion of the more efficiently absorbed wavelengths.

Radiation Pathways

Figure 4:
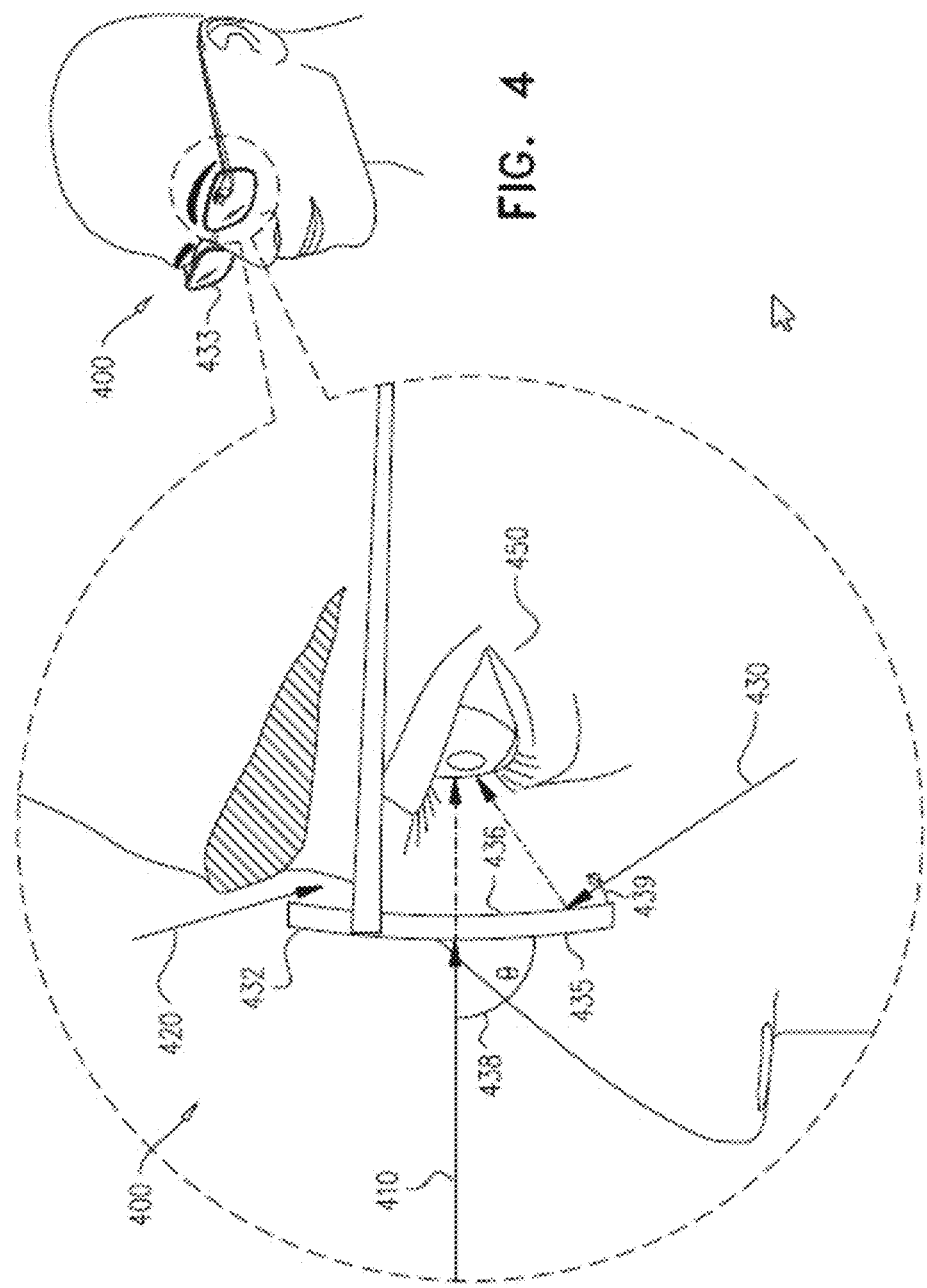
FIG. 4 is a schematic diagram that illustrates how harmful IR radiation can reach the eye of a person wearing eyewear.

FIG. 4 schematically illustrates several radiation paths that end in an eye 450 and are possibly transmitted or reflected off a lens 432 of some eyewear 400. Radiation can travel along a direct pathway 410 through the front side 435 (or convex side) of the lens 432 at an angle of incidence (AOI), θ 438, for example, 90 degrees, through the back side 436 (or concave side) of the lens 432, at an angle of incidence, ø 439, and into the eye 450. Radiation can also follow a pathway 430 that includes reflection off of the back side 436 of the lens 432 and into the eye 450. Radiation can follow a pathway 420 passing into the eye 450 around the frame 433 unobstructed by the eyewear 400. (This effect may be more pronounced, for example, in eyewear 400 with smaller frames).

The transmission of IR radiation depends on the lens material, additives to the material in-mass, and the lens coatings on the front side 435 of the lens 432. For example, if the front side 435 of the lens 432 is coated with a layer that reflects IR light hitting the lens 432 at a particular AOI, for example by 30%, the transmission will be reduced by 30%. In another example, an IR absorbing material within the lens polymer, for example, absorbs 25% of the incoming IR radiation, reducing the transmission by 25%. Similarly, an anti-reflective coating applied to the back side 436 of the lens 432 can be designed to transmit IR radiation within a range of AOIs to varying degrees, and reduce reflections from the back side 436 of the lens 432 into the eye 350.

The IR Protection Factor(IRPF) and Safe Exposure Duration (SED)

An IR eyeglass protection rating, or IR protection factor (IRPF), also called the IR safety factor (IRSF), as disclosed herein represents a percentage reduction in flux at IR wavelengths due to filtering by the eyewear. Put differently, the IRPF accounts for the IR exposure to the eye and provides a measure of reduction of radiation exposure. The IRPF depends on the spectral irradiance of the light source, the transmitting and reflecting properties of the lens, and frame shape and position relative to the eye, and the ambient temperature, among other things.

Eyewear can also be characterized by a safe exposure duration (SED), after which the cells within the eye can suffer damage due to heating as described above. The IRPF can be expressed as the SED for a given flux in a given IR wavelength range, since the damage to the eye is caused by thermal energy, or heating. Below a particular flux, IR exposure can be harmless for a long time, in which case the eyeglasses wearer can disregard exposure to this radiation. However, when exceeding this threshold the radiation can be harmful, so the SED should be considered.

In order to evaluate the protective measure of the eyewear for photothermal damage, several elements should be considered, including but not limited to: the light source/illumination spectrum for the relevant bandwidth, the face and eye, the eyewear (frame and lenses), the transmitting and reflecting properties of the lenses for the relevant radiation bandwidth, the ambient temperature, etc. Each of these elements may be measured and/or modeled as appropriate.

The eyewear frame can be characterized by parameters/factors quantifying effects that influence the overall exposure. For example, factors affecting transmission of light to the eye via through the lens include the lens size and lens tilt with respect to the eye. If the location and distance of the light source from the eye is variable, e.g., the light source is not solar, the spot size on the retina may considered as well.

Determining the IRPF and SED

Figure 5A:
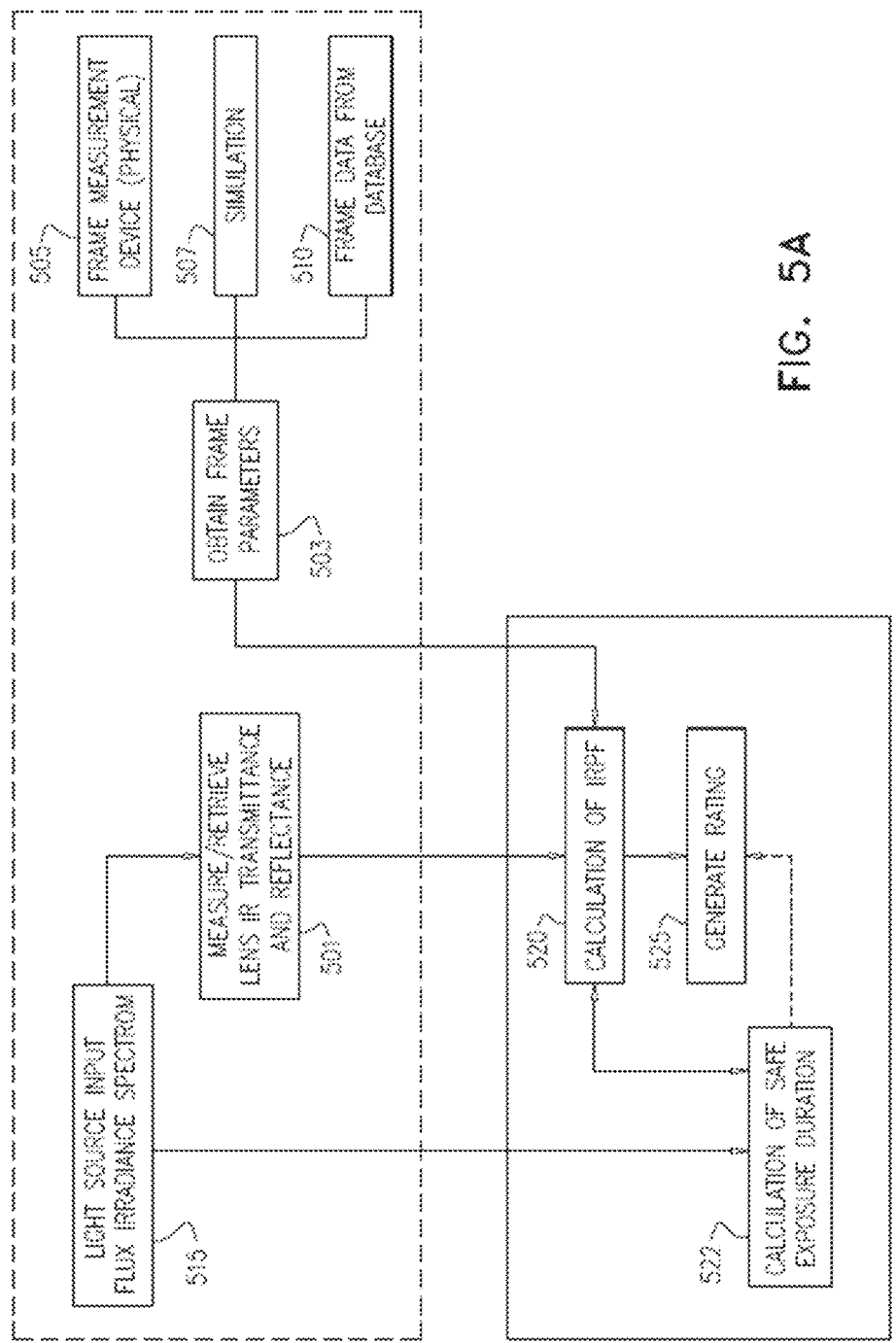
FIG. 5A is a flow diagram that illustrates a method for determining an IR Protection Factor (IRPF), Safe Exposure Duration (SED), and combined rating for eyewear.

FIG. 5A is a flow diagram showing a process 500 for obtaining an IRPF for a given pair of eyewear. The inputs for the process 500 include lens measurements 501 and the frame parameters 503 for the eyewear. The lens measurements 501 include the transmittance and reflectance from the lens complex, which includes the lens substrate and coatings. The transmittance and reflectance may be measured, estimated, and/or simulated based on the input flux spectrum 515 for the light source and band of interest, e.g., the solar spectral irradiance over the IR band. For instance, the lens measurements 501 can be obtained using a spectrophotometer or other suitable device. The transmittance can be measured by illuminating the lens from the front, and measuring the transmitted light. The lens illumination angle can be varied to comply with difference sources and lens functionalities. The reflectance is measured by illuminating the lens from the back, for example, at a 45-degree angle of incidence, and the reflected light is measured.

The frame parameters 503 include geometrical parameters related to the frame shape as described in detail below with respect to FIGS. 5C-5D. These geometrical parameters can be physically measured using a specialized tool (505), simulated using ray tracing techniques (507), provided by the frame manufacturer and stored in and retrieved from a database (510), or estimated using appropriate estimation techniques. If desired, the frame parameters 503 may be personalized and determined using the selected frame as it fits the face of the customer who will be wearing the eyewear. The frame parameters 503 may also be measured, simulated, or estimated using a head with average features.

Once the lens measurements 501 and frame parameters 503 have been obtained, the IRPF can be determined (520) as explained below, e.g., using a processor or other suitable computation device. The SED may also be determined (522) from the lens measurements 501 and frame parameters 503 and/or from the IRPF, also as explained below. And the IRPF and SED can be used to generate a combined rating (525) for the eyewear.

Light Source

The method 500 shown in FIG. 5A can be used to rate eyeglasses used in environments with varying light sources, including natural and artificial light sources, using the relevant spectral irradiance to evaluate exposure. Such light sources define the input flux spectrum 515 used as input to the IRPF and SED determinations. For example, the solar radiation spectrum is a broadband spectrum that can vary with latitude. Industrial sources of heat such as steel/iron production also fall into the infrared region. Lasers are a special source of IR radiation emitted over one or more extremely narrow wavelength bands. Industrial IR light sources can include welding equipment. The input for the rating calculation is the spectral irradiance of the light emitted by the light source, at least over the IR portion of the electromagnetic spectrum.

The light source(s) can also be used to measure, simulate, or estimate the frame parameters 503 as described below. For instance, the frame parameters 503 may vary with the number, position, directionality, and output spectra of the light source(s) (e.g., there may be a single overhead light source or multiple light sources at various locations). With multiple light sources, transmission, reflection, and direct light exposure may occur simultaneously. Such scenarios can come about in highly reflective outdoor environments, including beaches with sand and water, and locations with snow and ice.

Lens Measurements—Transmission and Reflection

The IR transmission $T_{IR}$ (for wavelengths $\lambda_1$ to $\lambda_2$, where, for example, $\lambda_1=780$ nm and $\lambda_2=1800$ nm, as 780 nm is the upper limit for visible radiation and most radiation above 1800 nm is absorbed by atmospheric water vapor) through a particular eyeglass lens for a given light source spectral irradiance, $E_S$, at a given angle of incidence, can be expressed as:

$$T_{IR} = 100\% \cdot \frac{\int_{\lambda_1}^{\lambda_2} \tau(\lambda) \cdot E_S(\lambda) \cdot A(\lambda) \cdot d\lambda}{\int_{\lambda_1}^{\lambda_2} E_S(\lambda) \cdot A(\lambda) \cdot d\lambda} \quad (1)$$

where $\tau(\lambda)$ is the fraction of light at the specified wavelength transmitted through the eyewear and $A(\lambda)$ is the heating hazard spectrum. Equation 1 is similar to the spectral transmittance defined in the standard ISO 13666, aside from the weighting by the heating hazard spectrum.

Similarly, the IR reflectivity can be expressed as:

$$R_{IR} = 100\% \cdot \frac{\int_{\lambda_1}^{\lambda_2} \rho(\lambda) \cdot E_S(\lambda) \cdot A(\lambda) \cdot d\lambda}{\int_{\lambda_1}^{\lambda_2} E_S(\lambda) \cdot A(\lambda) \cdot d\lambda} \quad (2)$$

where $\rho(\lambda)$ is the fraction of light at the specified wavelength reflected from the back side of the lens, including reflections from the convex and the concave surfaces. These expressions include integrals (continuous sums) over the relevant IR wavelength range, given $E_S(\lambda)$, the spectral irradiance (measured in W/cm$^2$) for the relevant light source (for example, the solar spectral irradiance).

Heating Hazard Spectrum $A(\lambda)$

Without being bound by any particular theory, thermal injury can be taken as dependent on energy absorption and scattering of infrared light in a volume of tissue for a given amount of incident energy delivered to a tissue by a light source. Scattering stems from the inhomogeneous composition of the tissue exhibiting variations in the refraction index, while absorption originates from the type of the light propagation media. Both absorption and scattering depend on the wavelength of the incoming light. The heating hazard spectrum $A(\lambda)$ describes the relative contribution of each wavelength to the heating of the eye.

The heating hazard spectrum can be defined independently of wavelength. The heating hazard spectrum can be taken as uniform or can accounts for wavelength-dependent absorption of the eye and its various components, including but not limited to water, pigment, protein, etc. For instance, the heating hazard spectrum can be weighted by the absorption spectrum of IR light in water and/or eye media (illustrated in FIG. 3), or specific heat, as is commonly compared to the absorption of the eye in the art, or a combined weighting of the absorption spectrum and the scattering effects per wavelength.

IR Protection Factor (IRPF)

The IRPF for a pair of eyeglasses can be expressed in terms of the eyeglasses' IR transmissivity and IR reflectivity:

$$IRPF = \frac{100\%}{aT_{IR} + bR_{IR} + c} \quad (3)$$

where a and b are factors relating to the IR transmission and IR reflection, respectively, and c is a constant value describing radiation that reaches the eye without being transmitted through or reflected off a lens surface (e.g., via pathway 420 in FIG. 4). The flux of IR light reaching the eyes can be expressed as $$\tilde{F}=F/IRPF \quad (4)$$

where F [W cm$^{-2}$] is the IR Flux for a particular source without eyewear, and $\tilde{F}$ [W cm$^{-2}$] is the reduced IR Flux due to the eyewear IR protection.

Frame Factors

The factors a, b, and c represent the geometry of the eyewear as it is worn. For example, increasing the distance between the eyewear and the wearer's eyes increases the frame factor b since the potential for reflected light off the backside of the lens is increased. Other geometrical parameters include the lens size, lens tilts, etc. Referring again to FIG. 4, light 410 directed at the front face 435 of the lens 432 contributes to a, light directed at the back face 436 of the lens 432 (e.g., form a source located behind the wearer) contributes to b, and light transmitted directly to the eye while the glasses 400 are worn contributes to c.

Several examples of frames as they are worn are illustrated in FIGS. 5B, 5C, and 5D, and examples of frame factors for each schematic can be found in TABLE 1. FIG. 5B is a schematic of a pair of safety googles 560 fixed to the wearer's face with a flexible rim 562 and a strap 561. Light reaching the eye in this scheme is transmitted through the lenses of the safety goggles 560. In FIG. 5C, a pair of eyeglasses 571 with wide and long lenses 572 is worn. There is a gap 573 between the eyeglass frame and the wearer's face through which light entering from the side and above can directly reach the wearer's eye. In FIG. 5D, a pair of eyeglasses 581 with short and wide lenses 582 is worn. Relatively less light will be transmitted through the lens, since the lens is smaller, and more light can be transmitted directly through gaps 583 between the eyeglasses and the face and reflected off the backside of the lens to the wearer's eye.

TABLE 1

Examples of frame factors for various eyewear geometries

| FIG. | Lens Type | a | b | c |
|---|---|---|---|---|
| 5B | Wrap/Safety | 1.0 | 0.0 | 0.0 |
| 5C | Large Lenses/vertical | 0.6 | 0.2 | 0.2 |
| 5D | Small Lenses/reading glasses | 0.5 | 0.2 | 0.3 |

Preferred values of a, b, and c may be defined by the following constraints/relations: IRPF ≥2.5; 50% <T<90%; 2% <R<10%; a/b≈1; c≤30; and a, b≤1.

Safe Exposure Duration

For someone wearing IR-protective eyewear, the safe exposure duration (SED), measured in seconds, can be expressed as a function of $\tilde{F}$ [W cm$^{-2}$], the reduced flux reaching the eyes:

$$t = (\tilde{F}/\mu)^{-\frac{4}{3}} \quad (5)$$

where μ is a empirically determined parameter depending on the surrounding ambient temperature. Combining Eqs. 3, 4, and 5 yields an expression for the SED under a specific source IR flux with a specific set of eyewear:

$$t = \left(\frac{F}{\mu \cdot IRPF}\right)^{-\frac{4}{3}} \quad (6)$$

For an ambient temperature of 25 degrees Celsius and t<1000 s, μ=1.8, which yields an SED of:

$$t = \left(\frac{F}{1.8 \cdot IRPF}\right)^{-\frac{4}{3}} \quad (7)$$

Figure 6A:
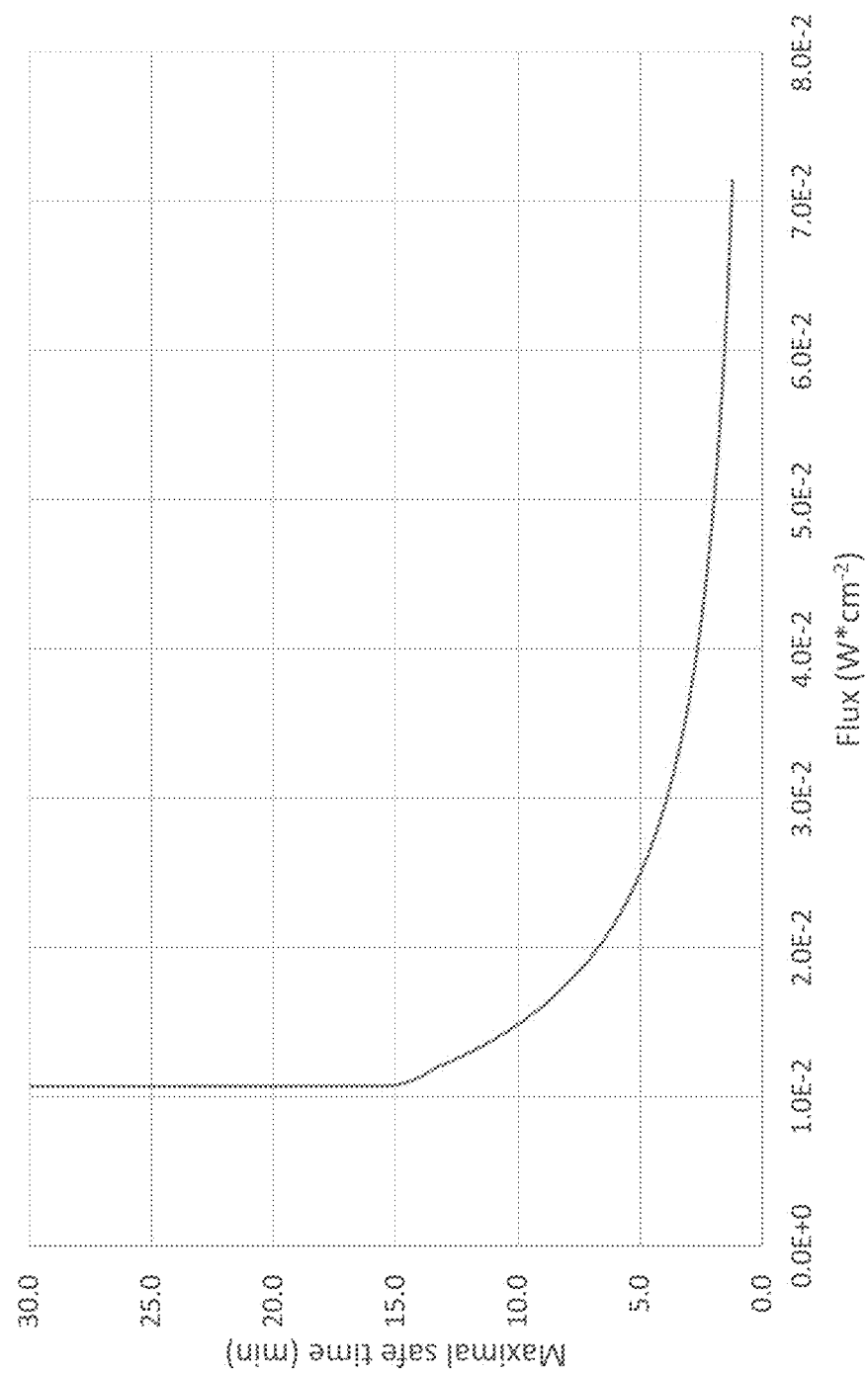
FIG. 6A is a graph of the SED in seconds as a function of flux.

In FIG. 6A, the SED is plotted as a function of input flux for the conditions outlined in Eq. 7. If the input flux is reduced to below 0.01 W/cm², the safe exposure time is infinite, i.e., the any flux above this threshold does not present a hazard. This feature can be used to calculate an 'ideal' IRPF required for a particular set of eyewear in order to reduce the flux to a non-hazardous level. Alternatively, if the ideal IRPF is not achieved due to the lens or frame properties, an SED can be supplied in order to inform the customer of the time related risks of exposure to IR radiation.

For example, standard sunny day flux as a result of IR irradiation is 0.0422 W cm$^{-2}$ when looking directly at the sun. In order to achieve an infinite safe exposure duration, the IRPF should be high enough to reduce the flux to a value lower than 0.01 W cm$^{-2}$. Applying these numbers in Eq. 4 yields the desired IRPF to allow:

$$0.01 < \frac{0.0422}{IRPF} \Longrightarrow IRPF > 4.22.$$

Sample calculations for various lens types at a standard sunny day flux (F=0.042 W/cm²) can be found in TABLE 2.

TABLE 2

Sample Calculations of IRPF and SED values

| Lens Type | Frame Type | T (%) | R (%) | a | b | c | IRPF | SED [mins] |
|---|---|---|---|---|---|---|---|---|
| None | None | 100 | NA | 1 | 0 | 0 | 1 | 2.5 |
| Clear + IR protective coating | Standard | 56 | 9 | 0.6 | 1 | 1 | 2.81 | 9.9 |
| Tinted + IR protective coating | Wrap | 41.5 | 9 | 1 | 0 | 0 | 2.41 | 8.1 |
| Clear | Standard | 80 | 12 | 0.6 | 1 | 1 | 1.47 | 4.2 |

Temperature Dependence

Figure 6B:
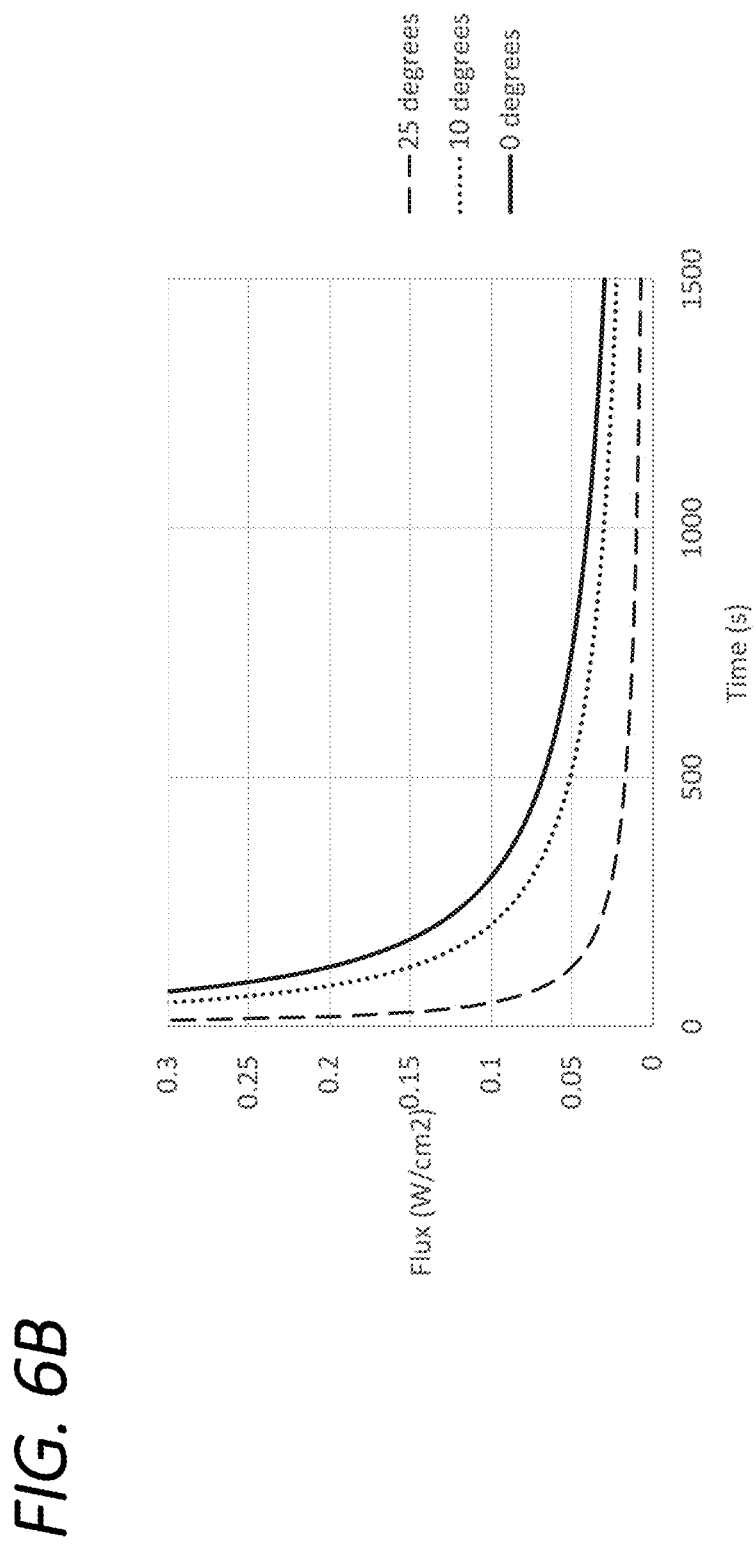
FIG. 6B is a graph of the flux versus exposure time for various ambient temperatures.

The ambient temperature impacts the SED through the empirically determined parameter μ. FIG. 6B is a plot of the flux against the SED for ambient temperatures of 0 degrees Celsius (upper curve), 10 degrees Celsius (middle curve), and 25 degrees Celsius (lower curve). As the ambient temperature decreases, the "safe" flux for long exposures (ideal' flux) increases. Without being bound by any particular theory, the increase in safe flux with decrease in temperature may be attributed to the dependence of heat transfer on the temperature gradient. When the gradient increases, the heat dissipates faster. In cold climates, for example, with an average ambient temperature of 0 degrees Celsius, the safe flux is ~0.04 W/cm² as opposed to 0.01 W/cm² at 25-30 degrees Celsius. In turn, the IRPF increases proportionally with the safe flux, as defined in Eq. 4. TABLE 3 contains the safe flux as a function of ambient temperature:

TABLE 3

Safe flux per ambient temperature

| Temperature (° C.) | Safe Flux (W/cm²) |
|---|---|
| 0 | 0.04 |
| 10 | 0.03 |
| 25 | 0.01 |

Scaling factors and modifications to the calculation can be put in place in order to generate a more precise SED that is location/climate dependent. The relative latitude can be associated with an average ambient temperature. For example, the average temperature at 0 degrees latitude may differ from that at 50 degrees latitude by 20 degrees Celsius, influencing the Safe flux, and consequently the SED.

Eye Model

The eye model, including the ocular lens, influences the light rays that pass through it and focus them on the retina. The eye can, for example, be modeled as a spherical lens with a power of 60 Diopters [D] at a predefined distance, for example, 17 mm from the sensor. The eye model can be used to measure the values a, b, and c, either with a physical measurement 505 or with a mathematical simulation 507 as shown in FIG. 5A.

Since the ocular lens focuses the light entering the eye on the fovea, the eye model can also be used in order to calculate the spot size, which is the area on the retina irradiated by the illumination, for non-solar sources located closer to the eye, with varying sizes. The ocular lens can be varied depending on the wearer's prescription, etc.

Simulating Transmittance (T) and Reflectance (R)

The transmittance and reflectance of the eyewear lenses can be simulated using knowing about the transmission and reflection spectra of the lens material(s) and of any coating(s) on the lenses. These spectra may be calculated or retrieved from a database as well understood in the art of optics. The transmittance and reflectance of the eyewear frames (e.g., for glossy or translucent frame material) may also be simulated or estimated based on knowledge of the frame materials. This information may be used in simulations (e.g., ray-trace calculations) of incident radiation on the eyewear and on an eye protected by the eyewear.

Experimentally Determining Frame Parameters (a, b, and c)

Figure 7C:
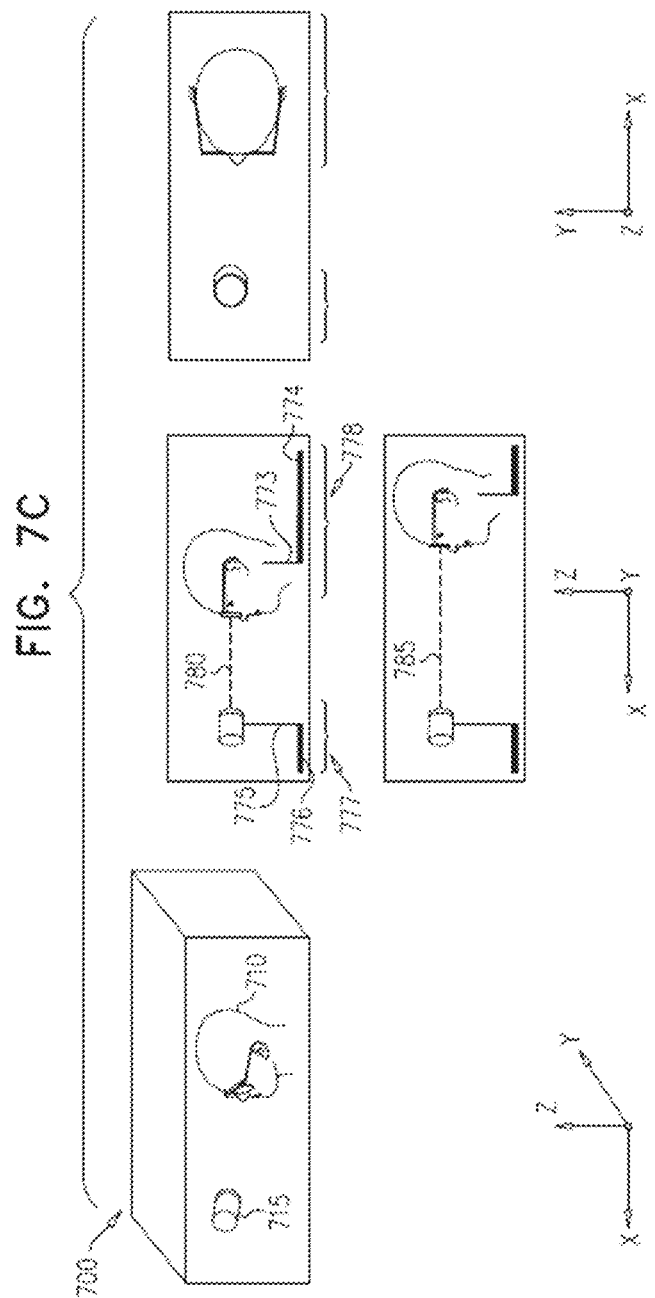

FIGS. 7A, 7B, and 7C are schematic representations of a various devices to measure frame factors. Each of these devices emulates the flux on the eye through a given pair of eyewear using an artificial head 710 with an eye model 735 comprising a lens 730, similar to the cornea of the eye with a given optical power, and a photosensitive sensor 737. In each device, the artificial head 710 is placed in the center of an enclosed casing, or housing 700, with a black absorbing surface, for example, with dimensions 1×1×1 meters. (In another embodiment, the floor and vertical walls in the room are mirrored in order to mimic a reflective environment, for example, a large body of water or a sandy/snowy environment.) A selected frame 720 including lenses 730 with known T and R values can be placed on the model head 710 as they would be worn by the wearer. The housing 700 is illustrated from various perspectives 740, 750. In FIG. 7A, the light source 715, such as a UV/VIS/IR lamp, illuminates the model head 710 from the front, and the readings from the sensor 737 are obtained, enabling measurements such as those outlined in steps 1-7 below.

In FIG. 7B, two UV/VIS/IR lamps 765 and 767 are located within the housing 700. One lamp 765 illuminates the model head 710 illuminating from the front, and the other lamp 767 illuminates the model head 710 from behind at an angle of 45 degrees to the x-axis.

The dimensions of the housing and the number of light sources and their positions can vary according to the desired environmental conditions. For instance, in an embodiment designed to measure safety lenses, the model head 710 may be placed in the center of the housing with a length of 1 meter, a width of 0.2 m, and a height of 0.2 m with a light source 715 located between 0 and 30 cm from the front side of the housing 700 and centered laterally and vertically.

In FIG. 7C, the UV/VIS/IR lamp 715 is affixed to an arm 775 which can be moved along a track 776 a variable distance 777. The model head 710 can be affixed to an arm 773 and moved along a track 774 a variable distance 778 as well, enabling the distance between the lamp 715 and the head model 780 to vary. This setup is particularly useful for industrial applications, in which the intensity of the source, for example, welding equipment, is known, and the distance between the tool and the wearer's head is known or varies within a particular range. Similarly, the UV/VIS/IR lamp irradiation direction or angle can be modified in order to generate angular flux measurements, and the irradiation spectrum and irradiation intensity and pulse length can be modified to mimic various light sources.

The devices shown in FIGS. 7A-7C enable the measurement of a, b, and c, by isolating the light reaching the eye from around the lens as follows:

1. Block light from both sides of the lenses, for example, using 100% absorbent black tape, rendering transmittance and reflectance zero;
2. Measure the flux as a result of the irradiance with and without the glasses;
3. Read $$\frac{\text{Flux without glasses}}{\text{Flux with glasses}} = \frac{F}{F'} = IRSF = \frac{100}{c}$$

(in this case: $F'=\tilde{F}$);

$$c = 100\frac{F'}{F};$$

4. Cover the convex/front side of the lens with 100% absorbent black tape. Measure the flux with the glasses;
5. Read $$\frac{\text{Flux without glasses}}{\text{Flux with glasses}} = \frac{F}{F''} = IRSF = \frac{100}{bR_{IR}+c}$$

(in this case: $F''=\tilde{F}$);

$$b = \frac{1}{R_{IR}}\left(\frac{100F''}{F} - C\right)$$

$IR_R$ is measureable and c is known, and b can be calculated

6. Measure the flux reaching the sensor with the eyeglasses, as is.
7. Read $$\frac{\text{Flux without glasses}}{\text{Flux with glasses}} = \frac{F}{F'''} = IRSF = \frac{100}{bIR_R+c}$$

(in this case: $F'''=\tilde{F}$);

$$a = \frac{1}{T_{IR}}\left(\frac{100F'''}{F} - bR_{IR} - c\right)$$

$IR_T$ is measurable, b, $IR_R$, c are calculated

The factors a, b, and c can be measured per frame. Frames that sit close to the face and wrap around lenses may have lower values of c, as seen in FIGS. 5B-5D and TABLE 1. Alternatively, the frame factors can be correlated to parameters often supplied with personalized prescriptions, including Back Vertex Distance (BVD), Frame Width (B), Frame Height (A), Frame tilts (Panoramic and Pantoscopic tilts), etc. For example, a large BVD may indicate that the direct and reflected light exposure is increased, increasing the values of b and c. In this case, values a, b, and c can be deduced approximately from standard parameters included in an ophthalmic prescription.

The rating can be modified and used in order to quantify the protection offered by eyewear in units of time under specific irradiation instead of optical density (OD). For instance, rating sunglasses may yield an indication of the desired percent transmittance and percent reflectance per frame in order to obtain a target safe exposure duration, e.g. several hours or no time limit. Similarly, rating clear eyeglasses (e.g., with IR coatings) in terms of SED under direct sun may be helpful for consumers who work outdoors in ensuring their eyes have adequate protection from photothermal damage.

Simulating the Frame Parameters (a, b, and c)

Radiation reaching the eye can be simulated (e.g., using a ray trace or by using a mixed model, such as a ray trace and wave equation solution) to account for coatings where interference is significant. It can also be simulated or calculated by evaluating the reflective/transmissive properties of the coating at various angles of incidence and interpolating between these angles. The dispersion relation may be used to evaluate the refractive properties of the lens bulk material as a function of wavelength. Several three-dimensional elements should be defined, including: the light source(s); the eye model (cornea, lens, aqueous humor, retina (sensor)); the eyewear lenses, including the curvature of the front and back sides of the lens, or a matrix of curvatures if curvatures for aspherical lenses; the eyewear frame; and the head/face. These models may take into account different parameters; for instance, the eye model may account for rays reaching the eye's surface and/or the various tissue types in the eye. The light source may be a directional light source (e.g., laser) or a light source equivalent to solar irradiance.

One method is to use a directional light source, measure the energy flux on the sensor for varying angles of illumination to obtain an angular flux distribution for a light source with a constant power, and possibly apply a weighting function on varying directions. The power is integrated over each direction. Particular steps for simulating the frame parameters may include:

1. Positioning the light source and direction;
2. Obtaining the three-dimensional (3D) frame shape, Lens shape (i.e. curvatures) and position;
3. Performing a ray trace through some or all illuminated optical elements;
4. Measuring energy flux for particular direction on center;
5. Repeating steps 1-4 for the desired illumination directions; and
6. Generating an angular map describing the glasses and weighted averaging for different light source positions and directions (e.g., above, below, behind, in front of).

When ray tracing, the contribution of transmitted rays and reflected rays may be considered separately in order to calculate the coefficients a, b, and c. The following method can be used:

1. Define the model, including the eyewear, a head, an eye, and a light source(s);
2. Perform ray traces with and without the eyewear;
3. Estimate the flux F of light incident on the eye without eyewear over the eye;
4. Detect which rays reach the eye sensor directly as opposed to being transmitted or reflected to the eye sensor via the eyewear;
5. Determine the flux, F', of the directly detected rays;
6. Determine the flux of the rays transmitted through and reflected from the eyewear (F" and F''', respectively); and
7. Given R and T, calculate a, b, and c, e.g., as described above with respect to FIGS. 7A-7C.

Safety Eyewear

An IRPF and SED can be particularly relevant for safety eyewear intended to be used in environment with high industrial heat. In such cases, the distance from the light source will be incomparable to that of Solar irradiation exposure, and thus the spot size on the retina must be accounted for. The IRPF, SED, and/or combined rating may also indicate a safe exposure to non-continuous IR light sources, such as pulsed laser.

Rating Format

The IRPF may be expressed as a percentage, ratio, or unitless value, whereas the SED can be expressed in seconds, minutes, hours, or any other unit of time. The combined rating may indicate a sliding scale or multiplier that indicates a maximum SED for a given peak or average irradiance within a given spectral band. The rating may also indicate that IR damage is negligible for a specific set of eyewear regardless of the environment. Alternatively, for protective eyewear in the case that the user is informed about industrial flux exposure, the rating can maintain that there is no time limit for exposure to infrared flux below a threshold, particular for a specific set of eyewear.

The rating formulation can consider a standard sunlight irradiation spectrum, and relate to each range of wavelengths with a rating that takes into account the damage pathway of that particular wavelength, and enable the glasses wearer to make a practical decision regarding their exposure, for example, by limiting their exposure time.

The rating can be used in conjunction with a UV-protection rating, or a HEV protection rating or both in order to provide an overall formulation providing information about protective properties from the various harmful bands separately. Any combination of the IRPF with another protective factor from harmful light can be formatted and printed on a label, for example.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of estimating protection provided by eyewear to a wearer of the eyewear from thermal damage due to infrared light, the method comprising:
   obtaining a first flux of the infrared light transmitted through a front surface of the eyewear toward an eye of the wearer;
   obtaining a second flux of the infrared light reflected off a back surface of the eyewear toward the eye of the wearer; and
   determining, based on the first flux and the second flux, an infrared (IR) flux reaching eyes of the wearer of the said eyewear, and estimating a time-dependent rating characteristic of the given eyewear comprising at least a safe exposure duration of the eyewear, the safe exposure duration representing a period after which the eye can suffer thermal damage due to infrared light while the wearer is wearing the eyewear and being determined as a predetermined time function of said IR flux.

2. The method of claim 1, wherein obtaining the first flux comprises measuring the first flux with a spectrophotometer.

3. The method of claim 1, wherein obtaining the first flux comprises simulating the first flux based on at least one of a lens of the eyewear or a shape of the eyewear.

4. The method of claim 1, wherein obtaining the first flux comprises accounting for a curvature of the front surface of the eyewear.

5. The method of claim 1, wherein obtaining the first flux comprises accounting for a coating applied to at least one of the front surface of the eyewear or the back surface of the eyewear.

6. The method of claim 1, wherein obtaining the second flux comprises accounting for a curvature of the back surface of the eyewear.

7. The method of claim 1, wherein obtaining the second flux comprises accounting for a coating applied to at least one of the front surface of the eyewear or the back surface of the eyewear.

8. The method of claim 1, wherein obtaining the second flux further comprises accounting for at least one total internal reflected of the infrared light off the front surface of the eyewear toward the back surface of the eyewear.

9. The method of claim 1, wherein said estimating of the safe exposure duration further comprises:
   weighting the first flux by a first factor depending on an area of at least one optical element in the eyewear; and
   weighting the second flux by a second factor depending an area between the eyewear and a head of a person wearing the eyewear.

10. The method of claim 1, wherein said estimating of the safe exposure duration further comprises scaling the safe exposure duration as a function of ambient temperature.

11. The method of claim 1, wherein said estimating of the safe exposure duration further comprises scaling the safe exposure duration as a function of wavelength of the infrared light.

12. The method of claim 1, further comprising:
   estimating a third flux incident on the eye of the wearer without reflecting off or propagating through the eyewear, and determining an infrared protection factor (IRPF) of the eyewear as a ratio between said IR flux and the third flux,
   wherein the safe exposure duration is further determined as a function of the IRPF.

13. Eyewear rated for protection from infrared light according to the method of claim 1.

14. The method of claim 1, further comprising estimating, based on the first flux and the second flux, an infrared protection factor (IRPF) of the eyewear, the IRPF representing a reduction in a flux of the infrared light reaching the eye of the wearer while the wearer is wearing the eyewear.

15. An apparatus for estimating protection provided by eyewear from infrared light, the apparatus comprising:
   a light source to produce the infrared light;
   one or more sensors, in optical communication with the eyewear, configured and operable to measure a first flux of the infrared light transmitted through a front side of the eyewear and a second flux of the infrared light reflected off a back side of the eyewear; and
   a processor device configured to estimate, based on the first flux and the second flux, at least a safe exposure duration of the eyewear and scale said safe exposure duration as a function of at least one of an ambient temperature and a wavelength of the infrared light, the safe exposure duration representing a period after which the eye can suffer thermal damage due to infrared light while the wearer is wearing the eyewear.

16. The apparatus of claim 15, further comprising:
   a support to hold the eyewear in optical communication with the light source.

17. The apparatus of claim 15, wherein said processor is further configured to estimate, based on the first flux and the second flux, an infrared protection factor (IRPF) of the eyewear, the IRPF representing a reduction in a flux of the infrared light reaching the eye of the wearer while the wearer is wearing the eyewear.

18. An eyeglass for use in an eyewear rated for quantifying an amount of infrared (IR) light exposure on eyes of a wearer, the eyeglass comprising:
a back face that reflects light; and
an indication of a time-dependent rating associated with the eyeglass, the time-dependent rating comprising at least a safe exposure duration, representing a period after which the eye can suffer thermal damage due to exposure of the eyes of the wearer to IR flux while the wearer is wearing the eyewear, based at least in part on an amount of IR light reflected from the back face of the eyeglass.

19. The eyeglass according to claim 18, further comprising:
a front face that transmits light,
wherein the time-dependent rating comprises at least said safe exposure duration which is further based on an amount of IR light transmitted through a front face of the eyeglass.

20. The eyeglass of claim 18, wherein the time-dependent rating further comprises an infrared protection factor (IRPF) of the eyewear representing a reduction in a flux of the infrared light reaching the eye of the wearer while the wearer is wearing the eyewear.

21. The eyeglass of claim 18, wherein the eyeglass is configured to reduce a flux of incident light within a wavelength range of about 780nm to about 1800 nm to below at least about 0.04 W/cm.sup.2 at an ambient temperature of about 0 degrees Celsius.

22. The eyeglass of claim 18, wherein the eyeglass is configured to reduce a flux of incident light within a wavelength range of about 780nm to about 1800 nm to below at least about 0.01 W/cm.sup.2 at an ambient temperature of about 25 degrees Celsius.

23. A method of estimating protection provided by eyewear to a wearer of the eyewear from thermal damage due to infrared light, the method comprising:
obtaining a first flux of the infrared light transmitted through a front surface of the eyewear toward an eye of the wearer;
obtaining a second flux of the infrared light reflected off a back surface of the eyewear toward the eye of the wearer; and
estimating, based on the first flux and the second flux, at least a safe exposure duration of the eyewear and scaling said safe exposure duration as a function of at least one of an ambient temperature and a wavelength of the infrared light, the safe exposure duration representing a period after which the eye can suffer thermal damage due to infrared light while the wearer is wearing the eyewear.

24. An eyeglass for use in an eyewear rated for quantifying an amount of infrared (IR) light exposure on eyes of a wearer, the eyeglass comprising:
a back face that reflects light; and
an indication of a rating associated with the eyeglass, the rating representing an IR light exposure amount to the eyes of the wearer, the rating being based at least in part on an amount of IR light reflected from a back face of the eyeglass;
wherein the eyeglass is configured to reduce a flux of incident light within a wavelength range of about 780 nm to about 1800 nm to below at least about 0.04W/cm2 at an ambient temperature of about 0 degrees Celsius.

25. An eyeglass for use in an eyewear rated for quantifying an amount of infrared (IR) light exposure on eyes of a wearer, the eyeglass comprising:
a back face that reflects light; and
an indication of a rating associated with the eyeglass, the rating representing an IR light exposure amount to the eyes of the wearer, the rating being based at least in part on an amount of IR light reflected from a back face of the eyeglass;
wherein the eyeglass is configured to reduce a flux of incident light within a wavelength range of about 780 nm to about 1800 nm to below at least about 0.01W/cm2 at an ambient temperature of about 25 degrees Celsius.

* * * * *